(12) United States Patent
Isham

(10) Patent No.: US 9,118,245 B2
(45) Date of Patent: Aug. 25, 2015

(54) DIGITAL VOLTAGE COMPENSATION FOR POWER SUPPLY INTEGRATED CIRCUITS

(71) Applicant: INTERSIL AMERICAS LLC, Milpitas, CA (US)

(72) Inventor: Robert H. Isham, Flemington, NJ (US)

(73) Assignee: Intersil Americas LLC, Milpitas, CA (US)

( * ) Notice: Subject to any disclaimer, the term of this patent is extended or adjusted under 35 U.S.C. 154(b) by 266 days.

(21) Appl. No.: 13/851,651

(22) Filed: Mar. 27, 2013

(65) Prior Publication Data

US 2014/0266141 A1  Sep. 18, 2014

Related U.S. Application Data

(60) Provisional application No. 61/792,745, filed on Mar. 15, 2013.

(51) Int. Cl.
*G05F 1/00* (2006.01)
*H02M 3/157* (2006.01)
*G06F 1/26* (2006.01)

(52) U.S. Cl.
CPC *H02M 3/157* (2013.01); *G06F 1/26* (2013.01)

(58) Field of Classification Search
CPC ..... H02M 3/157; H02M 3/156; H02M 3/158; G06F 1/26

USPC .......................................................... 323/283
See application file for complete search history.

(56) References Cited

U.S. PATENT DOCUMENTS

| | | | | |
|---|---|---|---|---|
| 5,471,131 A | * | 11/1995 | King et al. | 323/907 |
| 5,594,631 A | * | 1/1997 | Katoozi et al. | 323/283 |
| 2006/0055388 A1 | * | 3/2006 | Tang et al. | 323/284 |

OTHER PUBLICATIONS

"Multi-Phase PWM Controller with Linear 6-bit DAC Capable of Precision rDS(ON) or DCR Differential Current Sesing", "Data Sheet FN9156.2", Dec. 27, 2004, pp. 1-27, Publisher: Intersil.

* cited by examiner

*Primary Examiner* — Jue Zhang
(74) *Attorney, Agent, or Firm* — Fogg & Powers LLC

(57) ABSTRACT

Systems and methods for digital voltage compensation in a power supply integrated circuit are provided. In at least one embodiment, a method includes receiving a digital voltage code, the digital voltage code corresponding to an output voltage value; setting an output count on a first counter to change from a present first digital count corresponding to a present voltage code value toward a target first digital count corresponding to a new voltage code value; and setting a second count to an offset count value on a second counter when the new voltage code value is received. The method also includes combining the second count with the output count to form a combined count value; and decrementing the second count value from the offset count value to zero when the first counter reaches the target first digital count.

20 Claims, 4 Drawing Sheets

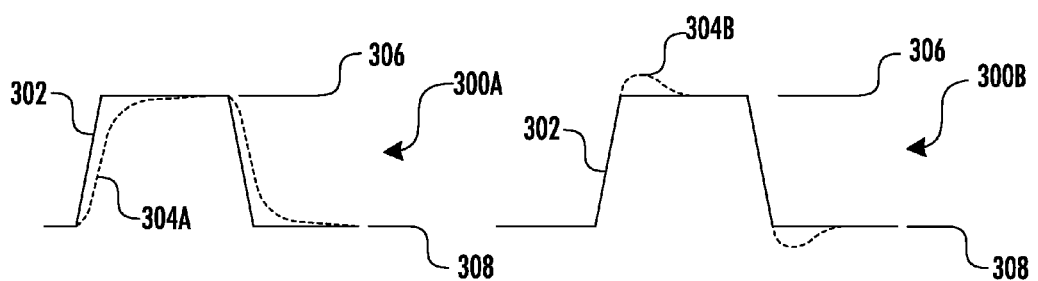
**FIG. 3A
(PRIOR ART)**
**FIG. 3B
(PRIOR ART)**
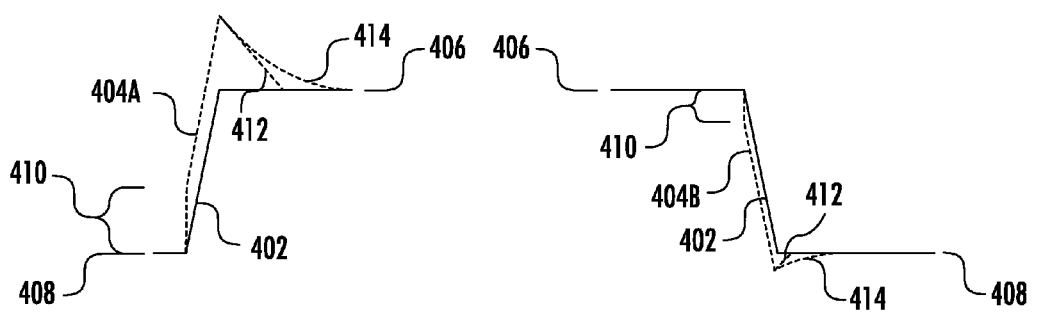
FIG. 4A
FIG. 4B

DIGITAL VOLTAGE COMPENSATION FOR POWER SUPPLY INTEGRATED CIRCUITS

CROSS-REFERENCE TO RELATED APPLICATIONS

This application claims the benefit of priority to U.S. Provisional Application No. 61/792,745, filed on Mar. 15, 2013, the disclosure of which is incorporated herein by reference.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 3A and 3B are graphs illustrating the different voltages provided by a prior art power supply circuit in response to voltages requested by the processor;

FIGS. 4A and 4B are graphs illustrating compensated voltages provided by a power supply circuit in response to voltages requested by the processor in one embodiment described in the present disclosure.

Figure 1:
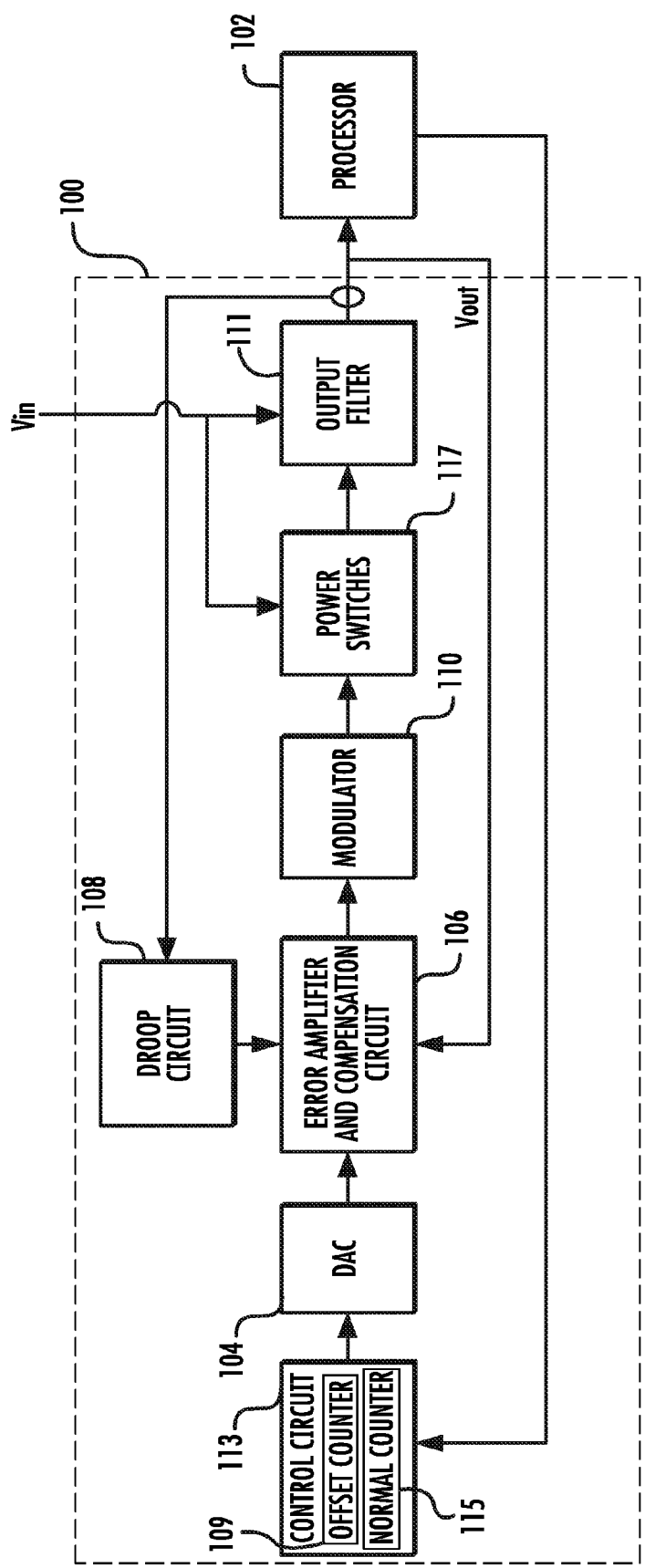
FIG. 1 is a block diagram of a switching voltage regulator for managing voltage provided to a processor in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

A power supply circuit providing a core supply voltage for a central processing unit (CPU) generally operates with a specified output impedance, i.e., the output voltage is lowered in a controlled manner from the requested voltage as load current gets higher. When a power supply circuit is commanded to change the provided voltage to a new value, extra load current is either sourced to or sunk from capacitors in an output filter as needed to charge or discharge the capacitors. The power supply circuit may be unable to distinguish this extra current from normal load current, resulting in a lag and rounding off of the output voltage as it is moved to the new voltage value. A CPU manufacturer may specify the allowable time to move to a new voltage, and requirements may be imposed such that the power supply circuit signals to the CPU that the new voltage is supplied within the allowable time as if there was no extra current. If the voltage has lagged while the CPU's current load to the power supply increased, commensurate with the higher target core voltage, then a lower (lagging) output voltage may cause the output voltage to fall below the minimum voltage needed for the CPU's proper operation.

The power supply circuit normally contains a control circuit that includes a register to hold the digital code corresponding to the requested supply voltage, a counter to feed a digital to analog converter (DAC), where the DAC generates a reference for the output voltage, and a digital means to determine the relative values of the register and the counter. When a requested voltage code (VID) is received that is higher than the existing DAC counter output, the counter is counted up (by a clock signal) until its digital output is equal with the register's content (holding the code corresponding to the requested supply output voltage). As discussed below, according to embodiments of the present invention, an offset is added to that count at the start of the upward transition, and the offset count feeds the DAC that drives the reference voltage. When the normal count reaches the target value such that it is equal with the register, the offset count is counted down to zero. The addition of an offset results in no lagging of the power supply's output voltage when the VID code adjusts the output voltage upward, without causing any undesirable undershoot when the VID code adjusts the output voltage of the supply downward.

FIG. 1 is a block diagram of a switching voltage regulator 100 for managing power that is supplied to a processor 102. The processor 102 may be any device that is configured to execute machine readable instructions. For example, the processor 102 may function as a CPU and as used above and below, the terms CPU and processor are interchangeable. When executing the instructions, the processor 102 consumes power that is provided to the processor 102 through a switching voltage regulator 100. In certain implementations, the amount of power consumed by the processor 102 depends on the computational load (i.e. the clock speed) of the processor 102. For example, when the processor 102 is called upon to execute many instructions within a short period of time, the processor 102 may require higher supply voltage and may consume more power than when the processor 102 is in an idle state. In certain embodiments, in order to perform computations, the processor 102 requests increases in voltage provided through a switching voltage regulator 100 before it increases its clock speed. Further, the increases in voltage may have associated time limits, within which time limits the switching voltage regulator 100 will provide the increased voltage. If the increased supply voltage is not provided to the processor 102 within the time limit, the execution of instructions by the processor 102 may become corrupted.

In at least one implementation, when the processor requests an increase in voltage, the processor 102 sends a digital voltage (VID) request to the switching voltage regulator 100, which passes the digital VID request to a control circuit 113 that controls a digital to analog converter (DAC) 104. The digital VID request calls for a particular voltage level from the power supply circuit 100. In response to the digital VID request, the control circuit 113 directs the DAC 104 to send an analog representation of the digital VID request to the error amplifier and compensation circuit 106 as a reference voltage. Aside of the analog reference voltage received from the DAC 104, error amplifier and compensation circuit 106 also receives a droop current from block 108, where the droop current is a current that is proportional to the total of load current used by the processor 102 and may include current needed to charge or discharge filter capacitors in the output filter 111 during a programmed output voltage change. As the error amplifier and compensation circuit 106 receives the droop current from 108, the output voltage of the switching voltage regulator 100 is lowered in a controlled manner as the droop current increases. Due to the current needed to charge or discharge the output capacitor of output filter 111 when the supply voltage Vout changes corresponding to a VID change issued by processor 102, extra droop current is either sourced to or sunk from circuit 106 by droop circuit 108. Because the error amplifier and compensation circuit 106 is unable to distinguish the change in droop current due to a programmed Vout change from normal droop current changes due to load current changes, the switching voltage regulator 100 output, Vout, lags and rounds off when changing according to a requested VID change from the processor 102. In cases of raising the requested voltage, the lagging and rounding off due to the droop current 108 may cause the switching voltage regulator 100 to momentarily provide less than the requested voltage and may lead to corruption of executing instructions. In cases of lowering the requested voltage, the lagging and rounding off may cause the processor to be consuming temporarily more power than is necessary to execute instructions, but lagging during a downward Vout adjustment does not lead to corruption of the processor's operation. The voltage provided by the error amplifier and compensation circuit 106 is input into modulator 110 (typically a pulse width modulator, PWM). Modulator 110 controls the power switches 117 which provide a phase voltage. The phase voltage is filtered by an output filter 111 generating the Vout output voltage to the processor 102. Further, the power switches 117 and output filter 111 are coupled to a power source Vin from an external system.

To prevent the switching voltage regulator 100 from lagging and rounding off when responding to an upward change in requested voltage, data sent to the DAC 104 by control circuit 113 is offset such that the voltage reference provided to the error amplifier and compensation circuit 106 reaches and exceeds the requested target voltage prior to the time when the output voltage is needed to reach the target voltage (i.e. it overshoots the target reference voltage corresponding to the new VID code). For example, when the processor 102 requests a new VID that is higher than the previous VID, a control circuit 113 in the switching voltage regulator 100 receives the requested VID and may initialize two counters, a normal (VID) counter and an offset counter 109. The offset counter 109 output is added to the normal counter 115 that is sent to the DAC 104 to control the reference voltage provided by the DAC 104. The normal counter 115 counts up to the requested new target voltage, then stops. The offset counter 109 may be a fixed value while the normal counter 115 is counting, and when the normal counter 115 reaches the target value, the offset counter 109 begins to count down to zero. The digital count provided to the DAC 104 by the control circuit 113 and the analog reference provided by the DAC 104 to the error amplifier and compensation circuit 106 is therefore a voltage that, at the beginning of a VID change, starts from a higher (offset) value instead of the reference voltage before the VID code change started and reaches a value that is beyond the requested final target voltage, then ramps back towards the requested target voltage. With the proper selection of the offset the output voltage of the switching voltage regulator 100 achieves the requested target voltage by the requested time, slightly overshoots the requested target voltage, and transitions back to the requested target voltage. The same function can be implemented for a requested VID value that is below a present voltage value. When the processor 102 requests a voltage that is below the currently received voltage, the control circuit 113 subtracts an offset count from the normal counter 115 and provides the new count to the DAC 104, when the normal counter 115 reaches a target value, the offset count is decremented towards zero. Because of the offset, the reference voltage provided by the DAC 104 goes below the final target voltage and then ramps back up to the target voltage. As some systems may be very sensitive to a too-low output voltage, less offset (or no offset) may be used when the voltage transitions from a higher voltage to a lower voltage.

Figure 2:
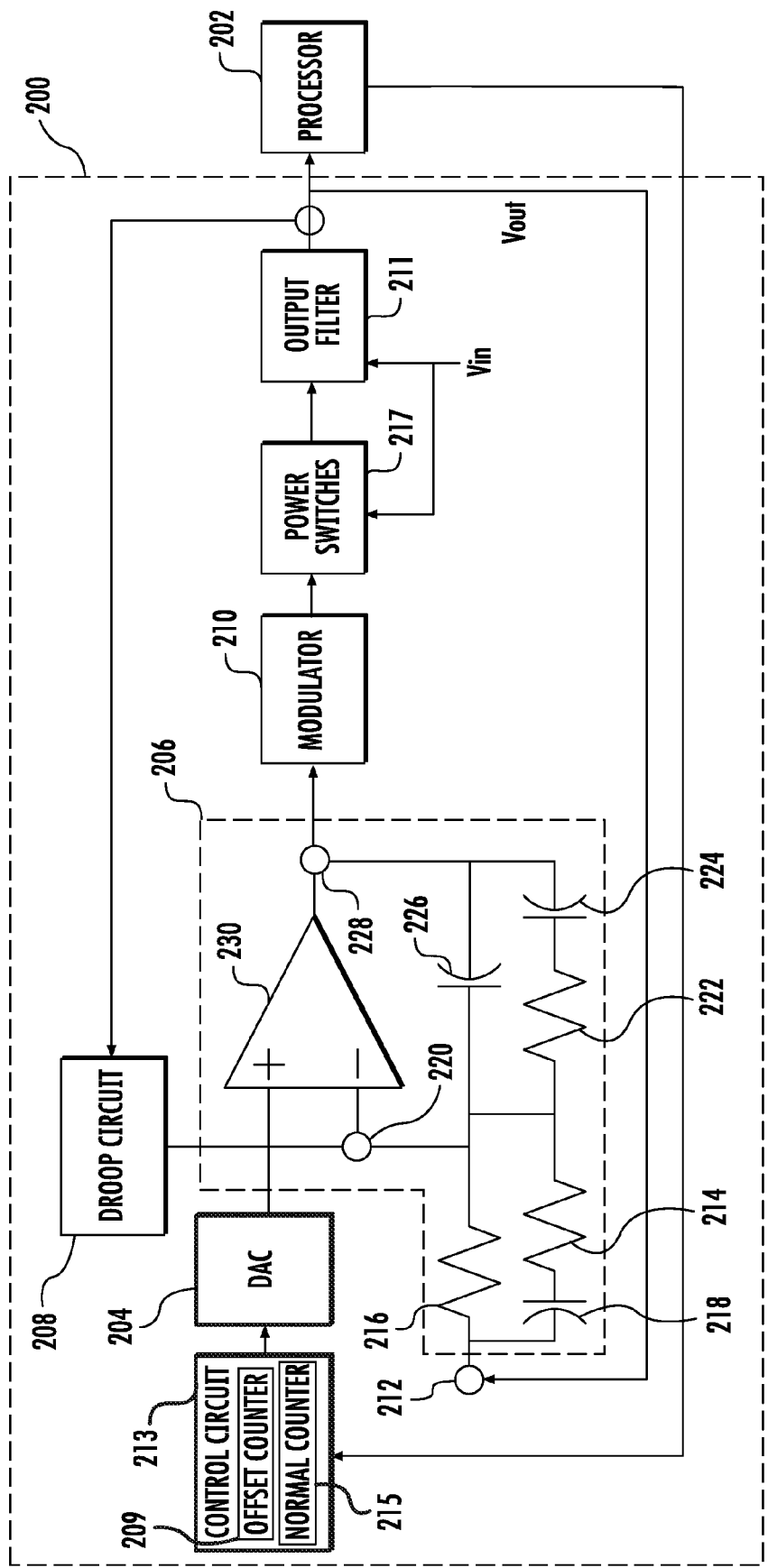
FIG. 2 is a schematic of a power supply circuit in one embodiment described in the present disclosure.

FIG. 2 is a schematic diagram of an exemplary switching voltage regulator 200. As illustrated, error amplifier and compensation circuit 206 provides a more detailed view of the error amplifier and compensation circuit 106 in FIG. 1. Other circuits correspond to their like-named circuits in FIG. 1. That is, 202 corresponds to 102, 204 to 104, 208 to 108, 209 to 109, 210 to 110, 211 to 111, 213 to 113, 215 to 115, and 217 to 117.

In certain implementations, the error amplifier and compensation circuit 206 receives three inputs and outputs a control signal 228 to a modulator 210. The three inputs are a reference voltage from the DAC 204, the droop current from 208, and a fed back voltage signal 212 ($V_{OUT}$) from the output of the switching voltage regulator 200. The error amplifier and compensation circuit 206 and modulator 210 use the three inputs to adjust a switching frequency and/or pulse widths of the power switches 217 to maintain an output voltage that substantially corresponds to the reference value supplied by DAC 204. The error amplifier and compensation circuit 206 may control gain and phase characteristics to meet a desired accuracy and response time for providing power to a load. In certain embodiments error amplifier 230 is part of an integrated controller circuit while the resistors and capacitors of the error amplifier and compensation circuit 206 are external components. In other embodiments the resistors and capacitors of the error amplifier and compensation circuit 206 are also part of the integrated controller circuit.

In at least one implementation, the error amplifier 230 may be a differential amplifier that receives a reference voltage from the DAC 204 and amplifies the difference between the reference voltage and the voltage at a feedback node 220. The error amplifier and compensation circuit 206 components may include resistors 214, 216, and 222 and capacitors 218, 224, and 226. To reduce the output voltage as a function of the output current the droop current from 208 is passed through the feedback resistor 214. A higher droop current from 208 (corresponding to a higher regulator output current) increases the voltage drop on resistor 216 resulting in a lower output voltage Vout. The compensation circuit of error amplifier and compensation circuit 206 is a single implementation of a possible compensation circuit in error amplifier and compensation circuit 206. As one having skill in the art would understand numerous other implementations of the compensation circuit are possible and are contemplated herein.

In certain prior art implementations, a power supply circuit, (such as switching voltage regulator 100) may undercompensate or overcompensate for the excess droop current when Vout changes due to a requested VID code change from a processor or other device requesting a voltage change. FIGS. 3A and 3B are graphs illustrating the output voltage provided by a power supply circuit as compared to the requested VID from a processor. For example, FIG. 3A is a graph 300A illustrating the provided voltage 304A from an undercompensated power supply circuit in response to a requested VID 302 that both requests a higher voltage level 308 and a lower voltage level 306. As illustrated in FIG. 3A, when the power supply circuit undercompensates (or has no compensation at all) for Vout change induced droop current changes, and the requested VID 302 rises from a low voltage level 308 to a high voltage level 306, the provided output voltage 304A lags behind the requested VID 302, such that the provided voltage 304A is less than the requested VID 302 for a period of time, when the requested VID 302 moves from a low voltage level 308 to a high voltage level 306. Because the provided voltage 304A is less than the requested VID 302, the operation of a processor can be negatively affected. In contrast, when the requested VID moves from a high voltage level 306 to a low voltage level 308, the provided voltage 304A still lags behind the requested VID 302, however, since the requested VID is moving from a high voltage level 306 to a low voltage level 308, the lagging of the provided voltage 304A behind the requested VID 302 causes the provided voltage 304A to be above the requested VID 302. When the provided voltage 304A is above the requested VID 302, a processor is able to function correctly but may draw temporarily more power than is necessary or desirable.

In an alternative prior art embodiment, having a prior art R-C based compensation between the inverting input of the error amplifier and ground, the output voltage may be overcompensated. FIG. 3B is a graph 300B illustrating the provided voltage 304B from of such an overcompensated power supply circuit in response to a requested VID 302 that both requests a higher voltage level 308 and a lower voltage level 306. As illustrated in FIG. 3B, where the power supply circuit over compensates for a droop current changes resulting in Vout change due to VID code changes, the requested VID 302 rises from a low voltage level 308 to a high voltage level 306, the provided voltage 304B rises with the requested VID 302 but overshoots the high voltage level 306 by rising to a voltage level above the high voltage level 306 and then transitioning back down to the high voltage level 306. In contrast to the undercompensated power supply circuit of FIG. 3A, by overshooting the high voltage level 306, the provided voltage 304B is equal to or above the requested VID 302 when the requested VID 302 transitions from a low voltage level 308 to a high voltage level 306. Because the provided voltage 304B is above the requested VID 302, the performance of a processor receiving the provided voltage 304B is not negatively affected. In contrast, the overcompensated power supply circuit negatively affects the performance of a processor when the requested VID 302 transitions from the high voltage level 306 to the low voltage level 308. For example, because the provided voltage 304B is provided by an overcompensated power supply circuit, the provided voltage 304B undershoots the low voltage level 308 to a voltage level below the low voltage level 308. Because the provided voltage 304B undershoots the low voltage level 308, the performance of a processor may suffer when a requested VID 302 transitions from a high voltage level 306 to a low voltage level 308.

In certain prior art implementations, adding external discrete components to an undercompensated system, as shown in compensation circuit 206 in FIG. 2, can change the system to an overcompensated system. For example, if a series resistor/capacitor combination is connected from feedback node 220 to ground, the added circuitry will sink or source current into 220 during voltage transitions as 220 moves higher or lower to follow an increase or decrease in DAC 204 voltage. However, the same compensation is added when the DAC 204 voltage increases or decreases. If, for instance, the system response is as in FIG. 3A and the correct series resistor/capacitor combination is added to achieve the desired response in the upward direction of FIG. 3B, the system will also give the undesired undershoot response in the downward direction of FIG. 3B.

When the power supply circuit is an undercompensated, or not compensated, for the effects of droop current due to programmed Vout changes the DAC offset method of the present invention described above in relation to FIG. 1 can be used to ensure that the voltage provided by the power supply circuit is equal to or greater than the one corresponding to the VID code from the processor during an up transition, or follows more closely the desired down transition. FIGS. 4A and 4B are graphs illustrating the voltage provided by a power supply circuit as compared to the reference voltage corresponding to the VID code from a processor when the power supply circuit receives a reference voltage from a DAC that includes a DAC offset according to the present invention.

FIG. 4A is a graph illustrating the implementation of a DAC offset with the provided voltage 404A by a power supply circuit when the requested VID 402 transitions from a low voltage level 408 to a high voltage level 406. As illustrated, when the requested VID 402 begins transitioning from the low voltage level 408 to the high voltage level 406, an offset 410 is added by the DAC to the provided voltage 404A. In at least one implementation, the offset 410 exists as an offset count that is added to a normal count that begins counting from the low VID value corresponding to voltage level 408 to the high VID value corresponding to voltage level 406. When the normal count reaches the high level corresponding to voltage level 406, the DAC begins to count the offset count down towards zero. By applying the offset 410, the provided voltage 404A overshoots the voltage requested by the processor or other device, such that the provided voltage 404A is above the requested VID 402.

In certain implementations, the offset increases with an increase in the requested VID code change ($\Delta$VID) such that the offset 410 may be calculated to be equal to $K_1+K_2\Delta$VID where $K_1$ is a programmed offset, $K_2$ is a programmed gain and $\Delta$VID is the difference between the VID codes corresponding to the high voltage level 406 and the low voltage level 408. Further, when the offset 410 is counted down towards zero, the offset may approach zero using a linear countdown 412 or an exponential countdown 414. Alternative other countdown methods (functions), known to those skilled in the art, are also contemplated to countdown the offset count towards zero. In certain implementations, when the offset is linearly countdown there is a risk that the provided voltage 404A may become less than the requested VID 402. By exponentially transitioning from the offset count towards zero, the risk of the provided voltage 404A becoming less than the requested VID 402 is decreased. Further, in certain embodiments, the offset 410 is limited to be within a certain value.

FIG. 4B is a graph illustrating the implementation of a DAC offset according to the present invention with the provided voltage 404B by a power supply circuit when the requested VID 402 transitions from a high value corresponding to high voltage level 406 to a low value corresponding to voltage level 408. As illustrated, when the requested VID 402 begins transitioning from the high voltage level 406 to a low voltage level 408, a negative offset 410 is added by the DAC to the provided voltage 404b. In at least one implementation, the offset 410 exists as an offset count that is deducted from a normal count that begins counting from high level to a lower level. When the normal count reaches the low level corresponding to voltage level 408, the DAC begins to count the offset count back up towards zero. By applying the offset 410, the provided voltage 404B is able to move more quickly towards the low voltage level 408. Likewise, when the requested VID 402 transitions from the high voltage level 406 to the low voltage level 408, the negative offset count can be counted back up to zero using a linear countdown 412, an exponential countdown 414, and the like. In cases when undershoot is not desirable the negative offset applied in downward VID code adjustment can be eliminated (i.e. offset applied only during upward VID code adjustment), or, alternatively, the backward count of the offset counter can be started before the VID counter reaches the lower target value corresponding to Vout target level 408.

Figure 5:
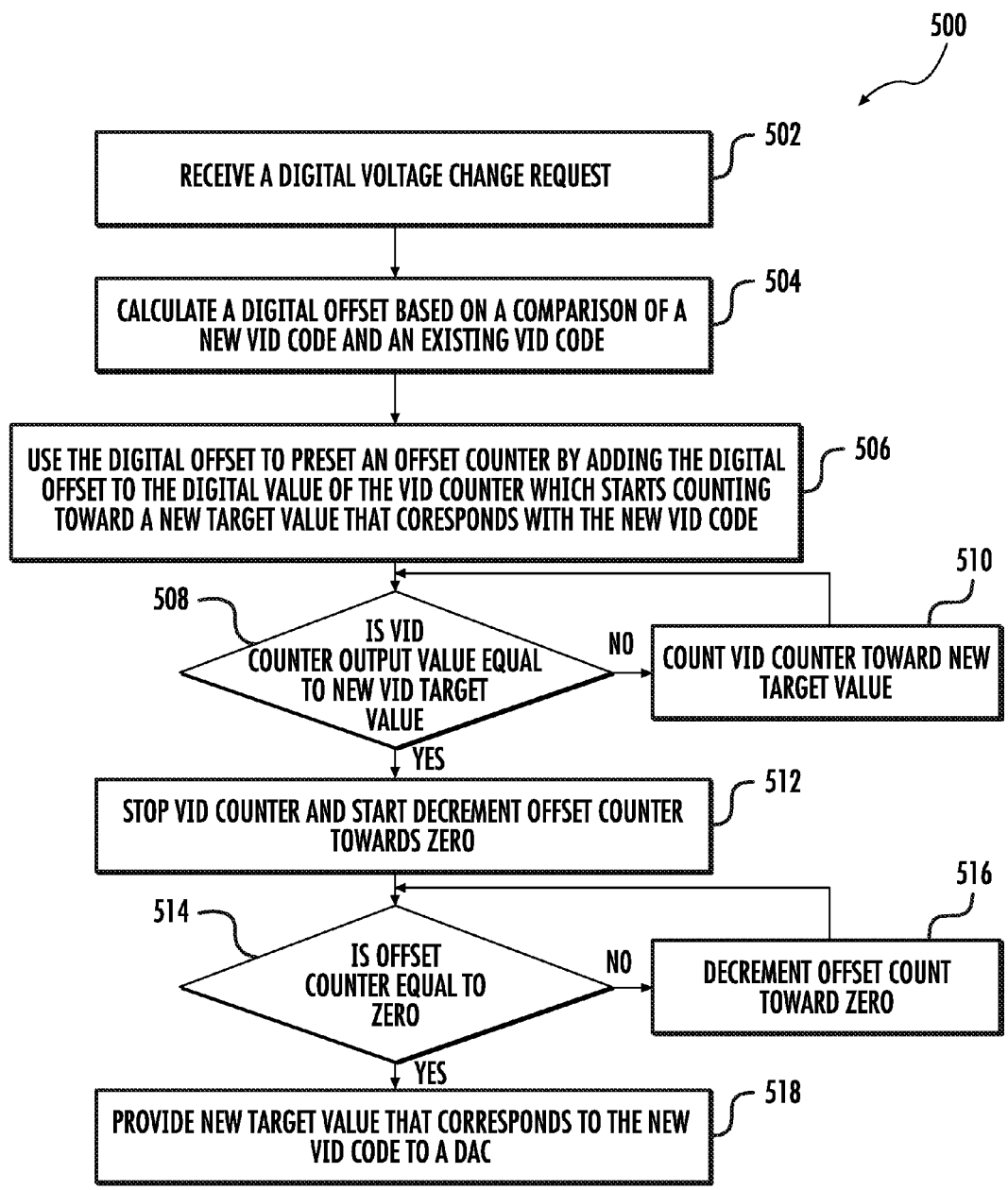
FIG. 5 is a flow diagram of a method for providing voltage in response to a digital voltage code in one embodiment described in the present disclosure.

FIG. 5 is a flow diagram of a method 500 for offsetting a DAC reference voltage provided to the error amplifier. To offset the DAC reference voltage, method 500 starts at 502 where a digital voltage change request is received. For example, a processor sends a new VID code to the control circuit. Method 500 then proceeds to 504 where a digital offset is calculated based on a comparison of the new VID code and the existing VID code corresponding to the existing DAC voltage. Method 500 then proceeds to 506 where the digital offset is used to preset an offset counter and the digital offset is added to the digital value of the VID counter which then starts counting toward its new target value corresponding to the new VID code. The digital value of the sum of the VID counter and the offset counter is used by the DAC to provide the analog reference voltage. Further, the VID (normal) counter is either incremented or decremented based on whether the digital voltage request (the new VID code) transitions towards a higher or a lower value (corresponding to a higher or lower new target output voltage).

In at least one exemplary implementation, method 500 proceeds to 508 to determine whether the VID counter output value and the new VID target value are equal to one another. If the VID counter output value and the target value are not equal to one another, method 500 proceeds to 510, where the VID counter is counted toward the new target value. If the VID counter's output value and the new target value are equal to one another, method 500 proceeds to 512, where the VID counter is stopped and the offset counter is decremented toward zero. Thus, method 500 proceeds to 514 to determine whether the offset counter is equal to zero. If the offset count is not equal to zero then the method 500 proceeds to 516, where the offset count is counted (decremented) toward zero. If the offset count is equal to zero, then the method 500 proceeds to 518 where a new target value, corresponding to the new VID code, is provided to the DAC, where a power supply circuit then provides the requested voltage to a processor. Different count profiles (e.g. linear, exponential, etc.) may be implemented via modulating the frequency of the counter used for decrementing the offset counter.

EXAMPLE EMBODIMENTS

Example 1 includes a power supply providing an output voltage, the power supply comprising an error amplifier controlling the power supply based on comparing a reference voltage with a feedback voltage representative of the output voltage, one input of the error amplifier being coupled to a feedback voltage via at least one resistor, wherein the error amplifier receives the output voltage representation through the feedback voltage; a droop circuit generating a droop current dropping a droop voltage on the at least one resistor; a first counter having an output count that is changed from a present first digital count corresponding to a present voltage code value toward a target first digital count corresponding to a new voltage code value based on a received digital voltage code that corresponds to an output voltage value; a second counter having a second output count and being preset to an offset count value when the new voltage code value is received, wherein the output count of the first counter is combined with the second output count of the second counter to generate a combined count value; wherein the second counter decrements the second output count from the offset count value to zero when the first counter reaches the target first digital count; and a digital to analog converter (DAC) configured to provide the reference voltage based on the combined count value, wherein the DAC offsets the reference voltage based on the offset count value during an output voltage transition corresponding to a transition from the present voltage code value to the new voltage code value.

Example 2 includes the power supply of Example 1, wherein the DAC offsets the reference voltage corresponding to the offset count value when the output voltage transitions from a lower voltage value corresponding with the present voltage code value to a higher voltage value corresponding with the new voltage code value.

Example 3 includes the power supply of Example 2, wherein the control circuit overcompensates for a droop current change resulting from an output voltage transition from the lower voltage value to a higher voltage value.

Example 4 includes the power supply of any of Examples 1-3, wherein the second counter is counted down from the offset count value toward zero linearly.

Example 5 includes the power supply of any of Examples 1-4, wherein the second counter is counted down from the offset count value toward zero exponentially.

Example 6 includes the power supply of any of Examples 1-5, wherein the offset count value is a function of a difference between the new voltage code value and the present voltage code value.

Example 7 includes the power supply of any of Examples 1-6, wherein the offset count value is a function of a predetermined programmed offset value.

Example 8 includes the power supply of any of Examples 1-7, further comprising a modulator coupled to the error amplifier, wherein the modulator modulates an input voltage for providing power for the output voltage.

Example 9 includes the power supply of any of Examples 8-9 wherein the output voltage provides a supply voltage for a processor, and wherein the digital voltage code is generated by the processor.

Example 10 includes the switching voltage regulator of Example 9, wherein the processor is notified when the first counter has reached the target first digital count.

Example 11 includes a method for providing power, the method comprising: receiving a digital voltage code, the digital voltage code corresponding to an output voltage value; setting an output count on a first counter to change from a present first digital count corresponding to a present voltage code value toward a target first digital count corresponding to a new voltage code value; setting a second count to an offset count value on a second counter when the new voltage code value is received; combining the second count with the output count to form a combined count value; and decrementing the second count value from the offset count value to zero when the first counter reaches the target first digital count.

Example 12 includes the method of Example 11, wherein the offset count value is set on the second counter when the present voltage code value corresponds to a lower voltage value and the new voltage code value corresponds to a higher voltage value.

Example 13 includes the method of any of Examples 11-12, further comprising: providing a reference voltage based on the combined count value; comparing the reference voltage with a feedback voltage representation of an output voltage on an error amplifier, wherein one input of the error amplifier is coupled to a feedback voltage via at least one resistor, wherein the error amplifier receives the output voltage representation through the feedback voltage; generating a droop current by dropping a droop voltage on the at least one resistor.

Example 14 includes the method of any of Examples 11-13, wherein decrementing the second count comprises at least one of: linearly changing the second count toward zero; and exponentially changing the second count toward zero.

Example 15 includes the method of any of Examples 11-14, wherein the offset count value is a function of at least one of: a difference between the new voltage code value and the present voltage code value; and a predetermined programmed offset value.

Example 16 includes a system for providing power to a processor, the system comprising: a processor configured to execute machine readable instructions, wherein the processor provides a digital voltage code; a first counter having an output count that is changed from a present first digital count corresponding to a present voltage code value toward a target first digital count corresponding to a new voltage code value based on the digital voltage code; a second counter having a second count being preset to an offset count value when the digital voltage code is received, wherein the output count of the first counter is combined with the second count of the second counter to generate a combined count value, wherein the second counter decrements the second count from the offset count value to zero when the first counter reaches the target first digital count; a digital to analog converter (DAC) configured to provide the reference voltage based on the combined count value; an error amplifier configured to compare a reference voltage with a feedback voltage representative of the output voltage, one input of the error amplifier being coupled to the feedback voltage via at least one resistor; a droop circuit generating a droop current dropping a droop voltage on said at least one resistor; and a modulator coupled to the error amplifier, wherein the modulator modulates an input voltage for providing power to the processor.

Example 17 includes the system of Example 16, wherein the DAC offsets the reference voltage corresponding to the second count when the output voltage transitions from a lower voltage value corresponding with the present voltage code value to a higher voltage value corresponding with the new voltage code value.

Example 18 includes the system of Example 17, wherein the control circuit overcompensates for a droop current change resulting from an output voltage transition from the lower voltage value to a higher voltage value.

Example 19 includes the system of any of Examples 16-18, wherein the second counter decrements the second count by at least one of: linearly changing the second count toward zero; and exponentially changing the second count toward zero.

Example 20 includes the system of any of Examples 16-19, wherein the offset count value is a function of at least one of: a difference between the new voltage code value and the present voltage code value; and a predetermined programmed offset value.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A power supply providing an output voltage, the power supply comprising:
    an error amplifier controlling the power supply based on comparing a reference voltage with a feedback voltage representative of the output voltage, one input of the error amplifier being coupled to a feedback voltage via at least one resistor, wherein the error amplifier receives the output voltage representation through the feedback voltage;
    a droop circuit generating a droop current dropping a droop voltage on the at least one resistor;
    a first counter having an output count that is changed from a present first digital count corresponding to a present voltage code value toward a target first digital count corresponding to a new voltage code value based on a received digital voltage code that corresponds to an output voltage value;
    a second counter having a second output count and being preset to an offset count value when the new voltage code value is received, wherein the output count of the first counter is combined with the second output count of the second counter to generate a combined count value;
    wherein the second counter decrements the second output count from the offset count value to zero when the first counter reaches the target first digital count; and
    a digital to analog converter (DAC) configured to provide the reference voltage based on the combined count value, wherein the DAC offsets the reference voltage based on the offset count value during an output voltage transition corresponding to a transition from the present voltage code value to the new voltage code value.

2. The power supply of claim 1, wherein the DAC offsets the reference voltage corresponding to the offset count value when the output voltage transitions from a lower voltage value corresponding with the present voltage code value to a higher voltage value corresponding with the new voltage code value.

3. The power supply of claim 2, wherein the control circuit overcompensates for a droop current change resulting from an output voltage transition from the lower voltage value to a higher voltage value.

4. The power supply of claim 1, wherein the second counter is counted down from the offset count value toward zero linearly.

5. The power supply of claim 1, wherein the second counter is counted down from the offset count value toward zero exponentially.

6. The power supply of claim 1, wherein the offset count value is a function of a difference between the new voltage code value and the present voltage code value.

7. The power supply of claim 1, wherein the offset count value is a function of a predetermined programmed offset value.

8. The power supply of claim 1, further comprising a modulator coupled to the error amplifier, wherein the modulator modulates an input voltage for providing power for the output voltage.

9. The power supply of claim 8 wherein the output voltage provides a supply voltage for a processor, and wherein the digital voltage code is generated by the processor.

10. The power supply of claim 9, wherein the processor is notified when the first counter has reached the target first digital count.

11. A method for providing power, the method comprising:
    receiving a digital voltage code, the digital voltage code corresponding to an output voltage value;
    setting an output count on a first counter to change from a present first digital count corresponding to a present voltage code value toward a target first digital count corresponding to a new voltage code value;
    setting a second count to an offset count value on a second counter when the new voltage code value is received;

combining the second count with the output count to form a combined count value; and decrementing the second count value from the offset count value to zero when the first counter reaches the target first digital count.

12. The method of claim 11, wherein the offset count value is set on the second counter when the present voltage code value corresponds to a lower voltage value and the new voltage code value corresponds to a higher voltage value.

13. The method of claim 11, further comprising:

providing a reference voltage based on the combined count value;

comparing the reference voltage with a feedback voltage representation of an output voltage on an error amplifier, wherein one input of the error amplifier is coupled to a feedback voltage via at least one resistor, wherein the error amplifier receives the output voltage representation through the feedback voltage;

generating a droop current by dropping a droop voltage on the at least one resistor.

14. The method of claim 11, wherein decrementing the second count comprises at least one of:

linearly changing the second count toward zero; and
exponentially changing the second count toward zero.

15. The method of claim 11, wherein the offset count value is a function of at least one of:

a difference between the new voltage code value and the present voltage code value; and a predetermined programmed offset value.

16. A system for providing power to a processor, the system comprising:

a processor configured to execute machine readable instructions, wherein the processor provides a digital voltage code;

a first counter having an output count that is changed from a present first digital count corresponding to a present voltage code value toward a target first digital count corresponding to a new voltage code value based on the digital voltage code;

a second counter having a second count being preset to an offset count value when the digital voltage code is received, wherein the output count of the first counter is combined with the second count of the second counter to generate a combined count value, wherein the second counter decrements the second count from the offset count value to zero when the first counter reaches the target first digital count;

a digital to analog converter (DAC) configured to provide the reference voltage based on the combined count value;

an error amplifier configured to compare a reference voltage with a feedback voltage representative of the output voltage, one input of the error amplifier being coupled to the feedback voltage via at least one resistor;

a droop circuit generating a droop current dropping a droop voltage on said at least one resistor; and a modulator coupled to the error amplifier, wherein the modulator modulates an input voltage for providing power to the processor.

17. The system of claim 16, wherein the DAC offsets the reference voltage corresponding to the second count when the output voltage transitions from a lower voltage value corresponding with the present voltage code value to a higher voltage value corresponding with the new voltage code value.

18. The system of claim 17, wherein the control circuit overcompensates for a droop current change resulting from an output voltage transition from the lower voltage value to a higher voltage value.

19. The system of claim 16, wherein the second counter decrements the second count by at least one of:

linearly changing the second count toward zero; and
exponentially changing the second count toward zero.

20. The system of claim 16, wherein the offset count value is a function of at least one of:

a difference between the new voltage code value and the present voltage code value; and a predetermined programmed offset value.

* * * * *